United States Patent
Zhang

(10) Patent No.: US 8,267,615 B2
(45) Date of Patent: Sep. 18, 2012

(54) CONNECTING MECHANISM

(75) Inventor: Guo-Qing Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 159 days.

(21) Appl. No.: 12/965,849

(22) Filed: Dec. 11, 2010

(65) Prior Publication Data

US 2011/0268499 A1  Nov. 3, 2011

(30) Foreign Application Priority Data

Apr. 28, 2010 (CN) .......................... 2010 1 0158341

(51) Int. Cl.
*B25G 3/28* (2006.01)
(52) U.S. Cl. .................................................. 403/356
(58) Field of Classification Search .......... 403/319, 403/355, 356, 357, 373, 374.1, 374.2, 374.3, 403/374.4
See application file for complete search history.

(56) References Cited

U.S. PATENT DOCUMENTS 2,543,854 A * 3/1951 Killingsworth ............... 301/114
3,033,597 A * 5/1962 Miller ............................. 403/15

* cited by examiner

*Primary Examiner* — Michael P Ferguson
*Assistant Examiner* — Daniel Wiley
(74) *Attorney, Agent, or Firm* — Altis Group, Inc.

(57) ABSTRACT

A connecting mechanism includes a transmission shaft, an adjustment member, a transmission member, a key, and a fastening member. The transmission shaft forms a first threaded portion and a second threaded portion, and axially defines an assembly groove between the two threaded portions. An adjustment member receives the first threaded portion. The transmission member is sleeved on the transmission shaft, and defines a receiving groove. The key is wedge-shaped. The key is partially received in the assembly groove of the transmission shaft, and partially received in the receiving groove of the transmission member. The fastening member engages the second threaded portion, and drives the key to resist the adjustment member.

12 Claims, 5 Drawing Sheets

CONNECTING MECHANISM

BACKGROUND

1. Technical Field

The present disclosure relates generally to transmission mechanisms and, more particularly, to a connecting mechanism using a key.

2. Description of Related Art

A key is generally positioned between a transmission shaft and a plurality of transmission members sleeved on the transmission shaft, thus preventing the transmission members from rotating relative to the transmission shaft.

A commonly used connecting mechanism includes a transmission shaft, a gear, and a key. The key is a substantially rectangular bar. The transmission shaft defines a receiving groove. The key is partially received in the receiving groove. A center of the gear defines a connecting hole. A sidewall in the connecting hole defines an engaging groove. When the gear sleeves on the transmission shaft, the key is partially received in the engaging groove of the gear.

However, the key is easily abraded over time, with a gap being generated between the transmission shaft and the gear, and the transmission precision of the transmission mechanism decreased accordingly.

Therefore, there is room for improvement within the art.

BRIEF DESCRIPTION OF THE DRAWINGS

The members in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
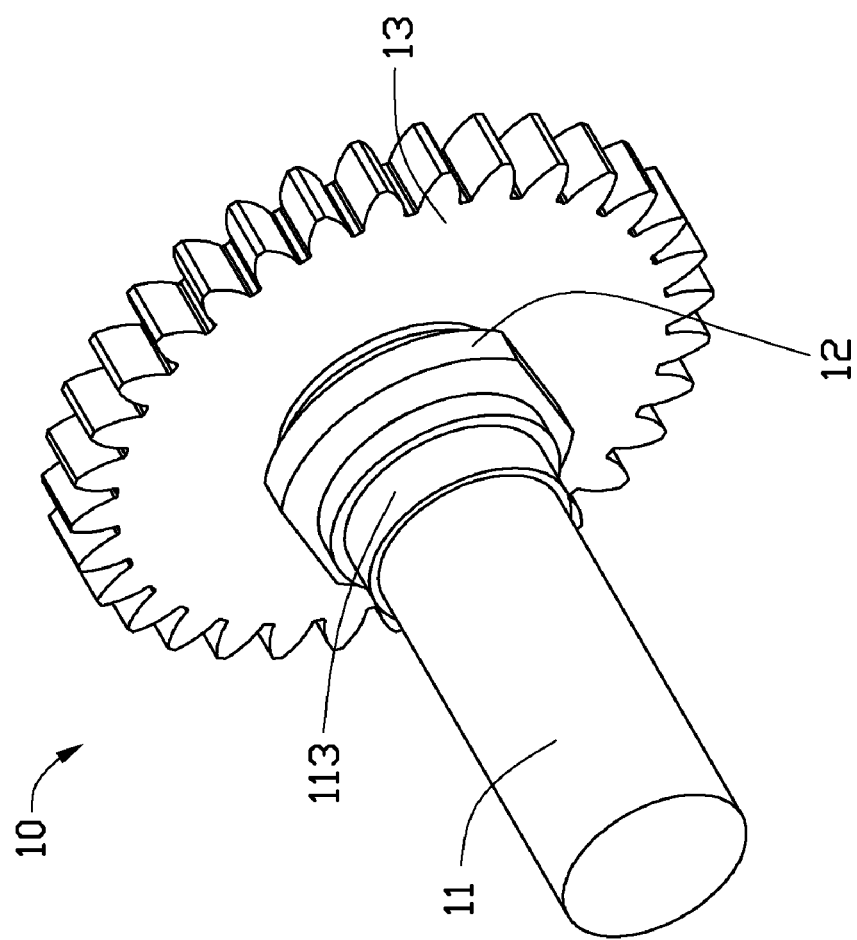
FIG. 1 is an assembled, isometric view of an embodiment of a connecting mechanism, including a transmission shaft, an adjustment member, a transmission member, a fastening member, and a key.
Figure 2:
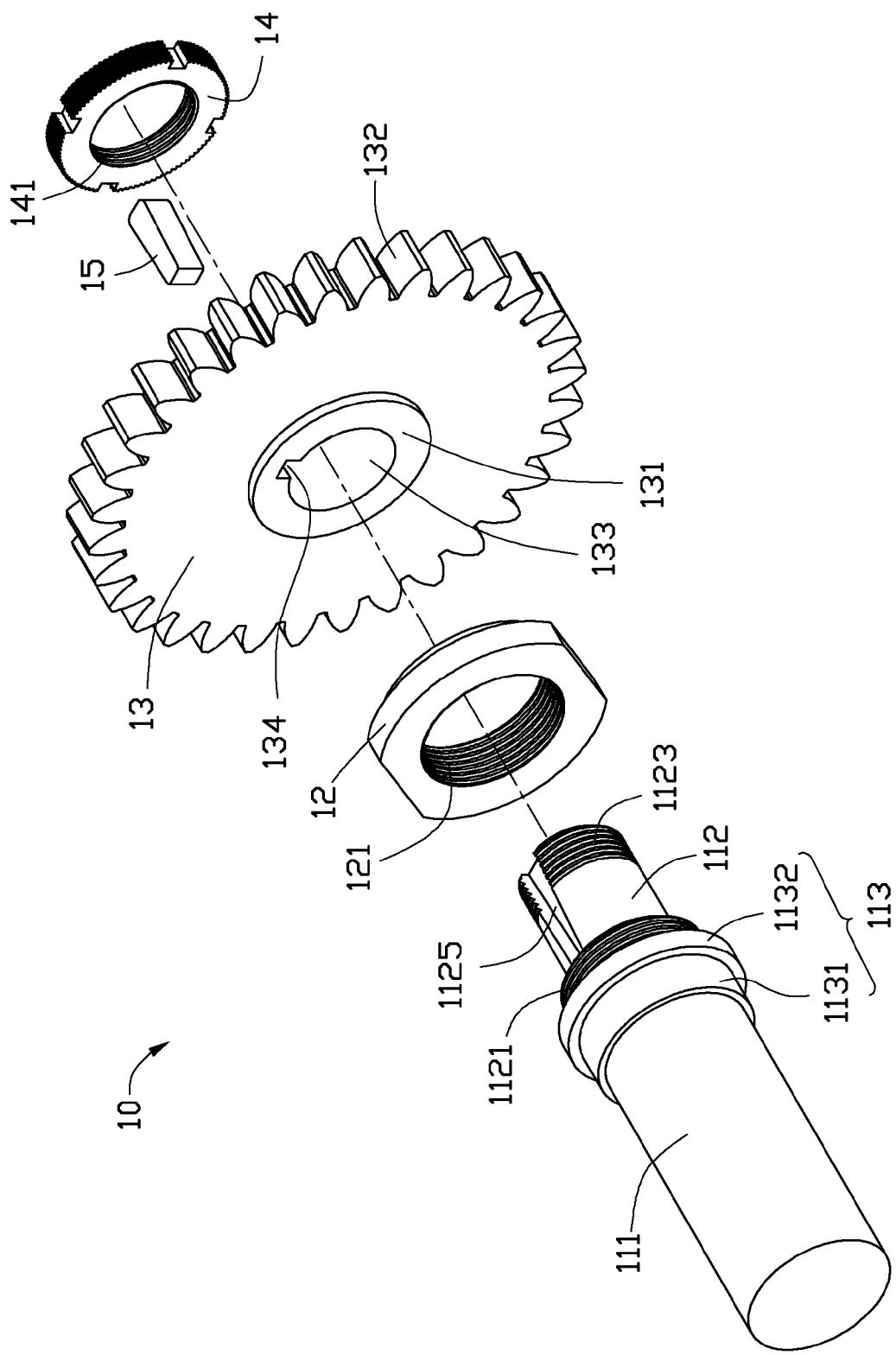
FIG. 2 is an exploded, isometric view of the connecting mechanism of FIG. 1.

Referring to FIGS. 1 and 2, an embodiment of a connecting mechanism 10 includes a transmission shaft 11, an adjustment member 12, a transmission member 13, a fastening member 14, and a key 15. The adjustment member 12, the transmission member 13, and the fastening member 14 are sleeved on the transmission shaft 11. The key 15 is positioned between the transmission shaft 11 and the transmission member 13.

The transmission shaft 11 includes a cylindrical shaft body 111 and an assembly portion 112 formed on an end of the shaft body 111. The shaft body 111 forms a flange 113 at an end adjacent to the assembly portion 112. The flange 113 includes a first ring portion 1131 and a second ring portion 1132 connected to the first ring portion 1131. A diameter of the first ring portion 1131 is less than that of the second ring portion 1132. The assembly portion 112 forms a first threaded portion 1121 at an end adjacent to the flange 113, and a second threaded portion 1123 at the other end thereof away from the flange 113. The assembly portion 112 further axially defines an assembly groove 1125 between the first threaded portion 1121 and the second threaded portion 1123. In the illustrated embodiment, the assembly groove 1125 is a wedge-shaped groove, with a width thereof increasing away from the first threaded portion 1121.

The adjustment member 12 defines a first threaded hole 121 for receiving the first threaded portion 1121. The fastening member 14 defines a second threaded hole 141 for receiving the second threaded portion 1123. In the illustrated embodiment, the adjustment member 12 and the fastening member 14 are a plurality of threaded retainers.

Figure 3:
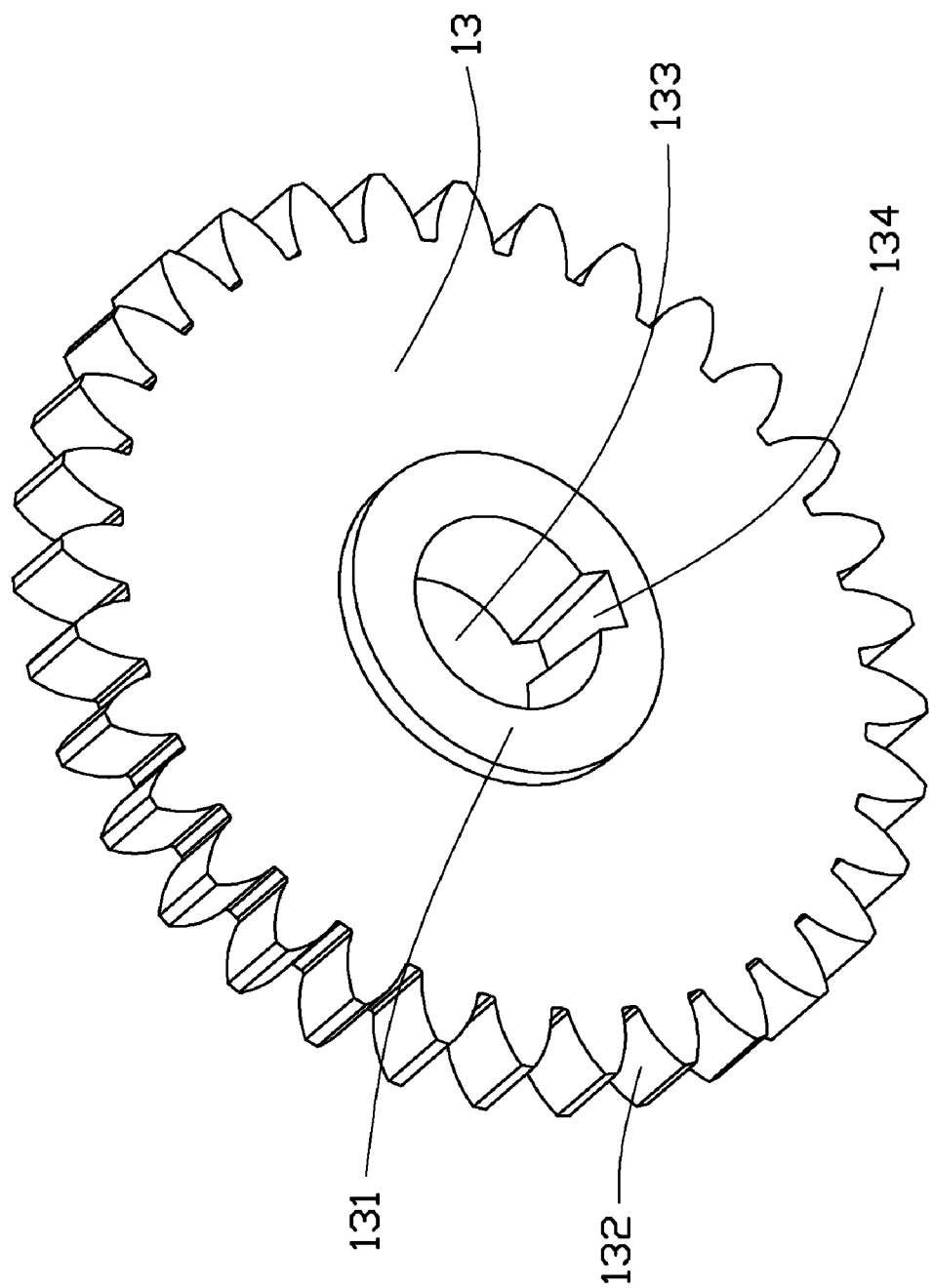
FIG. 3 is an isometric view of the transmission member of the embodiment.
Figure 4:
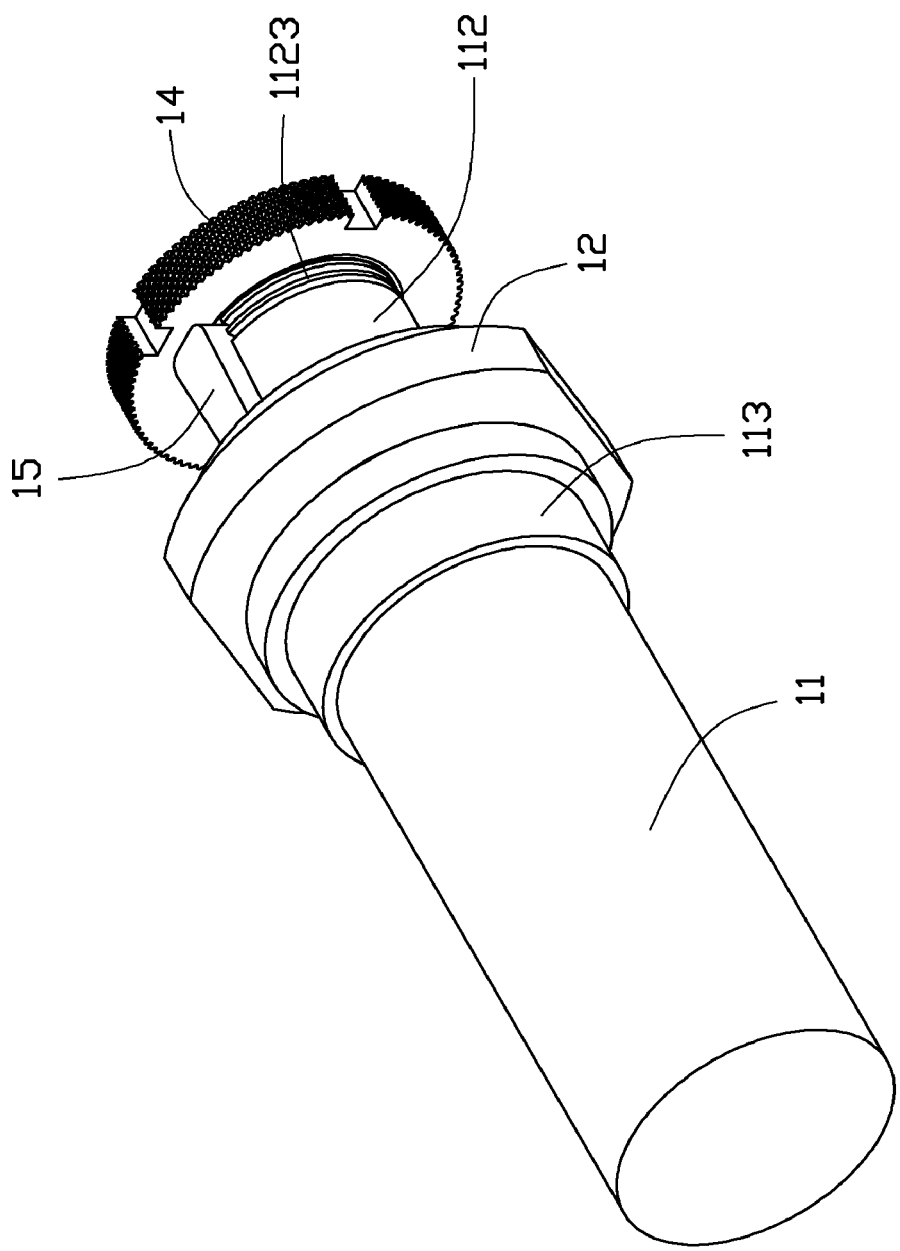
FIG. 4 is an isometric view of the connecting mechanism, omitting showing the transmission member.

Referring to FIG. 3, the transmission member 13 is a gear in this embodiment. The transmission member 13 forms a circular attaching portion 131 in a center, and a plurality of meshing teeth along the circumference thereof. The transmission member 13 defines a circular connecting hole 133. A sidewall in the connecting hole 133 defines a receiving groove 134. In the illustrated embodiment, the receiving groove 134 is a wedge-shaped groove, and a width of the receiving groove 134 increases from a first end surface to a second end surface of the transmission member 13.

The key 15 is wedge-shaped, that is, a width thereof is increased from one end to the other end. In the illustrated embodiment, the key 15 is substantially a frustum of a pyramid.

Referring to FIGS. 1 through 4, in assembly of the connecting mechanism 10, the key 15 is partially received in the assembly groove 1125 of the transmission shaft 11. The adjustment member 12 receives the first threaded portion 1121. The transmission member 13 sleeves on the transmission shaft 11 with the key 15 partially received in the receiving groove 134. The fastening member 14 threads with the second threaded portion 1123. The fastening member 14 is rotated until the opposite ends of the key 15 respectively resist the adjustment member 12 and the fastening member 14.

When the connecting mechanism 10 is used over time, a gap is generated between the transmission shaft 11 and the transmission member 13, due to abrasion of the transmission shaft 11, the transmission member 13 and the key 15. When the adjustment member 12 and the fastening member 14 are rotated and moved toward the flange 113, the key 15 moves in the assembly groove 1125 towards the flange 113 being driven by the fastening member 14. As a result, a portion of the key 15 having a larger diameter is received in the receiving groove 134 of the transmission member 13, whereby the transmission shaft 11, the transmission member 13 and the key 15 are engaged snugly as had been before. The connecting mechanism 10 can continued to be effectively used, for a maximized service life.

Figure 5:
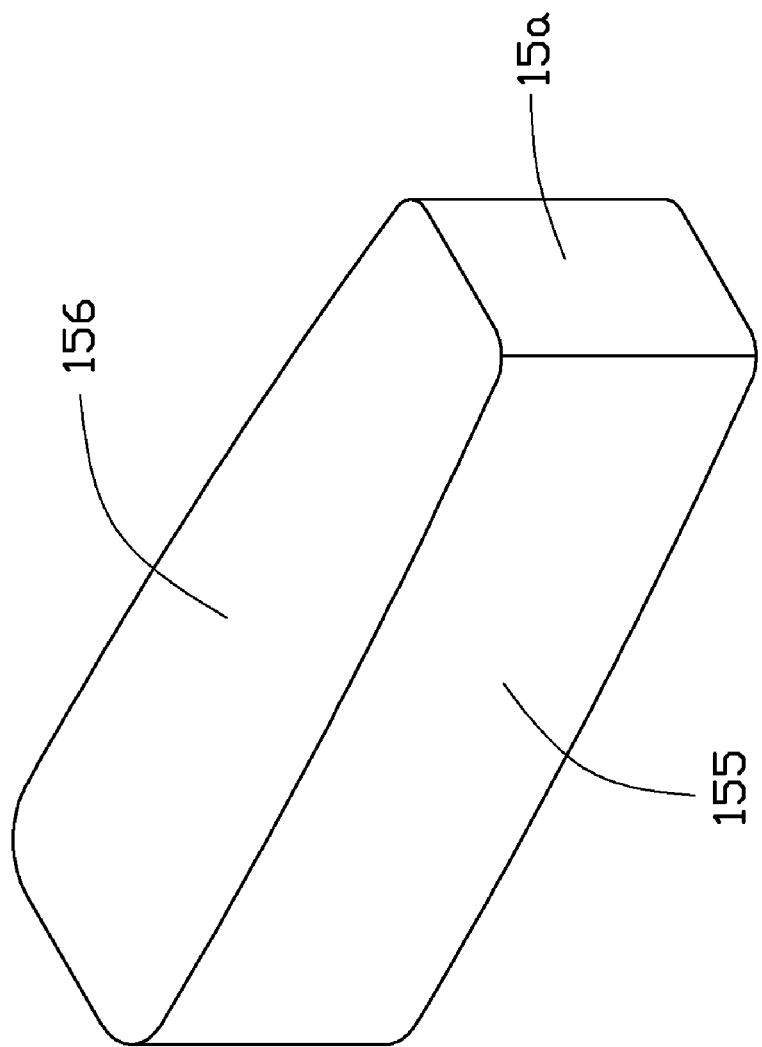
FIG. 5 shows another embodiment of the key.

It should be appreciated that the key 15 can be in other shapes. Referring to FIG. 5, in which the key 15a is wedge-shaped with two opposite surfaces 155 being curved, and two other surfaces 156 planar.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A connecting mechanism, comprising:
   a transmission shaft, the transmission shaft comprising a first threaded portion and a second threaded portion axially spaced from said first threaded portion, said transmission shaft further comprising an assembly groove extending axially from the first threaded portion through the second threaded portion;

an adjustment member threadingly engaging the first threaded portion;

a transmission member comprising a connecting hole extending therethrough, wherein the transmission shaft is received in said connecting hole, and wherein said connecting hole comprises a wedge-shaped receiving groove extending axially along a sidewall thereof;

a wedge-shaped key partially received in the assembly groove of the transmission shaft, and partially received in the receiving groove of the transmission member, said key comprising a first end face and a second end face opposite said first end face; and a fastening member threadingly engaging the second threaded portion, and engaging the first end face of said key;

wherein tightening the fastening member onto the second threaded portion drives the second end face of said key into said adjustment member.

2. The connecting mechanism of claim 1, wherein a width of the assembly groove increases away from the first threaded portion.

3. The connecting mechanism of claim 2, wherein a width of the receiving groove increases away from a first end surface to a second end surface of the transmission member.

4. The connecting mechanism of claim 1, wherein the transmission member is a gear.

5. The connecting mechanism of claim 1, wherein the key is a substantially frustum of a pyramid.

6. The connecting mechanism of claim 1, wherein a plurality of opposite surfaces of the key are curved.

7. The connecting mechanism of claim 1, wherein the transmission shaft forms a flange adjacent to the first threaded portion.

8. The connecting mechanism of claim 1, wherein the adjustment member is a threaded retainer.

9. The connecting mechanism of claim 8, wherein the fastening member is a threaded retainer.

10. The connecting mechanism of claim 1, wherein the transmission shaft comprises a shaft body and an assembly portion formed on an end of the shaft body.

11. The connecting mechanism of claim 10, wherein the shaft body forms a flange at an end adjacent to the assembly portion.

12. The connecting mechanism of claim 11, wherein the first threaded portion is formed at an end of the assembly portion adjacent to the flange, and the second threaded portion is formed at the other end of the assembly portion away from the flange.

* * * * *